US006996769B1

(12) United States Patent
Peikes et al.

(10) Patent No.: US 6,996,769 B1
(45) Date of Patent: Feb. 7, 2006

(54) METHOD AND SYSTEM FOR GENERATING DOCUMENTATION FROM OPERATING SYSTEM COMMAND SYNTAX

(75) Inventors: Wendy Peikes, Cupertino, CA (US); Fan Kong, Cupertino, CA (US); Ramanan Subrumanian, Sunnyvale, CA (US); David Cavanaugh, Los Gatos, CA (US); Thomas A. Stern, Lexington, KY (US); Palaniappan Jambulingam, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 726 days.

(21) Appl. No.: 09/796,865

(22) Filed: Feb. 28, 2001

(51) Int. Cl.
*G06F 17/00* (2006.01)
(52) U.S. Cl. ..................... 715/512; 715/515; 715/530
(58) Field of Classification Search ............... 715/500, 715/512, 513, 514, 515, 526, 530
See application file for complete search history.

(56) References Cited

U.S. PATENT DOCUMENTS

| | | | | |
|---|---|---|---|---|
| 5,513,305 A | * | 4/1996 | Maghbouleh | 715/500 |
| 5,867,817 A | * | 2/1999 | Catallo et al. | 704/255 |
| 6,047,389 A | * | 4/2000 | Thai | 714/38 |
| 6,141,660 A | * | 10/2000 | Bach et al. | 707/103 R |
| 6,157,953 A | * | 12/2000 | Chang et al. | 709/225 |
| 6,219,700 B1 | * | 4/2001 | Chang et al. | 709/222 |
| 6,366,967 B1 | * | 4/2002 | Wagner | 710/33 |
| 6,550,062 B2 | * | 4/2003 | Barajas et al. | 717/178 |
| 6,560,776 B1 | * | 5/2003 | Breggin et al. | 717/176 |
| 6,591,376 B1 | * | 7/2003 | VanRooven et al. | 714/36 |

* cited by examiner

*Primary Examiner*—Stephen Hong
*Assistant Examiner*—Gregory J. Vaughn

(57) ABSTRACT

A method, system thereof, and computer usable medium for generating webpages from specified and generated document content and for automatically generating human-readable documentation from operating system command specifications. The method, system and computer usable medium are compatible with and applicable to any operating system. In one embodiment, application is made to internetworking operating systems. In one embodiment, dynamic end user documentation webpages are automatically generated from live command specifications, obviating the task of manual documentation generation. In another embodiment, customized documentation content is generated. In one embodiment, a current list of user-available commands in a software release are promulgated. In one embodiment, documents are created for Command Line Interface. In another embodiment, the method and system thereof may be used with code other than Command Line Interface. In one embodiment, documentation content is separate from command specifications, advantageously facilitating localization, and promoting regular, accurate updating and revision of documentation.

33 Claims, 8 Drawing Sheets

METHOD AND SYSTEM FOR GENERATING DOCUMENTATION FROM OPERATING SYSTEM COMMAND SYNTAX

BACKGROUND OF THE INVENTION

1. Field of the Invention

The present invention relates to the field of computer software such as operating systems and their Command Line Interfaces. More specifically, the present invention relates to a method, system thereof, and computer usable medium for automatically generating human-readable documentation from operating system command specifications and generating webpages from specified and generated document content.

2. Related Art

Computer systems function, on one level, through the action of software implementing an operating system. An operating system controls the physical operation of the computer, e.g., electronic processes of the computer's subsystems and components implementing the function of the computer system. Operating systems are sometimes updated, revised, modified, improved, and enhanced. Such changes are incorporated through implementing new versions, e.g., releases of the operating system, and typically, loading the new releases onto a computer system, as it becomes available.

Operating system functionality is characterized and utilized, in one sense, by a list of commands which enable the operating system to control computer system function in accordance with a programmer's intent. These commands are specified and implemented via what is called the operating system's Command Line Interface.

All operating systems deploy a Command Line Interface through one modality or another. The Command Line Interface (CLI) provides the capability of non-programmatically, interactively accessing and controlling the computer system.

Commands are often grouped together in command files. Commands and command files may be changed, added, deleted, modified, substituted, or augmented with each release. Often, as operating system software develops, the list of commands and command files may grow quite large and become very complex. Using, for example, Cisco Systems' Internetworking Operating System™ (IOS)™, an operating system enabling the functionality of routers, e.g., computer systems specializing in internetwork routing, there are approximately 2,000 active commands presently extant at this writing; the number growing still. Each IOS release arrives with new and syntax-enhanced commands.

The documentation of each and every command and command file, including any and all changes, is a crucial responsibility, often shared or tasked between software engineering and technical writing, who may, as a team build webpages and other documents with command functionality as content. Conventionally, command and command file documentation has been performed manually. Manual documentation of commands and command files, even utilizing automated techniques, in accordance with the conventional art, is laborious, time-consuming, and tedious. Also, there has conventionally been no methodology for software engineers to provide command functionality details and updates to technical writers and other documentation team members. This has had the unfortunate consequence of rendering command documentation content acquisition an ad hoc process. This may have further consequences, e.g., errors, confusion, and conflict between the software engineers and technical writers tasked with making the commands and command file contents intelligible to the users of the computer systems. Further, it may also negatively impact system transparency and usability.

Further, as commands change and new commands are added, documents, including webpages, become obsolete. Technical writers responsible for documentation must constantly poll software engineers for new functionality data, command grammar, and new commands, in order to update webpages and other documents accordingly. The problems of the sheer number of commands and command files and growth in this number exacerbates the general industry tendency toward document obsolescence.

The rapidity of progress and change in software generates a documentation problem of growing magnitude.

The significance of documentation of CLI commands is amplified by its crucial importance to users of computer systems. Computer systems are simultaneously useful and versatile because they may be configured for particular tasks or modes of operations by their ultimate or penultimate users. Access to the computer enabling such user configuration is implemented, at one level, via CLI. Thus, user understanding of the functions of the various commands is crucial to a system's transparency and usefulness.

However, the size, complexity, and changing nature of the command list may become confusing, even bewildering for some users, highlighting the importance of accurate and readable command documentation. Further, users require command documentation that is current, transparent, intelligible, and readily accessible and applicable.

A related problem is localization to languages other than English. Localization to languages other than English enhances the usability of a system. Here, language differences may exacerbate both user needs and resultant problems related to documentation, and command syntax.

SUMMARY OF THE INVENTION

The present invention provides a method, system, and computer usable medium that can automatically generate human-readable command documentation from operating system command specifications.

In one embodiment, the present invention provides a method, system, and computer usable medium that can automatically generate human-readable command documentation from operating system command specifications. In the present embodiment, a software tool utilizes the command grammar from a command definition file to produce a customized parse tree. The parse tree has added intermediate annotations for command documentation. These annotations are written to the file created from the parse tree; they are not part of the final documentation. In one embodiment, an intermediate file which contains annotation for documentation is produced from command grammar, forming a custom intermediate representation abbreviated for the commands' parse tree.

In one embodiment, the present invention also provides a method, system, and computer usable medium for generating webpages and other transparent and readily accessible and usable documents from both programmer-specified and automatically tool-generated document content. In the present embodiment, a custom fast algorithm is utilized to create webpages by generating corresponding HyperText Markup Language (HTML) for the commands and their documentation. Manpages and lists of all commands may also be generated from intermediate representations, as well as abridged documentation information files for use by related software tools.

In one embodiment, the present invention provides a method, system, and computer usable medium which can accomplish the foregoing requirements, and which is compatible with and applicable to any operating system, and which is applicable to Command Line Interface as well as to other code. In one embodiment, application may be made to Cisco Systems' Internetworking Operating System™ (IOS) ™. In another embodiment, application may be made to progeny of IOS™. In another embodiment, application may be made to a UNIX CLI. In one embodiment, application is made to other operating systems. In one embodiment, the application is used to document the Command Line Interface (CLI). In another embodiment, the application may be used to document code other than the CLI.

In one embodiment, the present invention provides a method, system, and computer usable medium which can automatically generate dynamic end-user documentation and promulgate current lists of user-available commands in software releases. The documentation and command lists are generated from live command specifications. The automatic generation of these lists and documentation obviates the need to do so manually.

In one embodiment of the present invention, command documentation content is separated from the command definition. In one embodiment, the command documentation content and the command definitions are in separate files. In one embodiment, command documentation content files may be in English. In another embodiment, command documentation content files may be written in and translated from English and languages other than English. In one embodiment of the present invention, separation of documentation content from command specifications facilitates localization to languages other than English.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION OF THE INVENTION

Figure 1A:
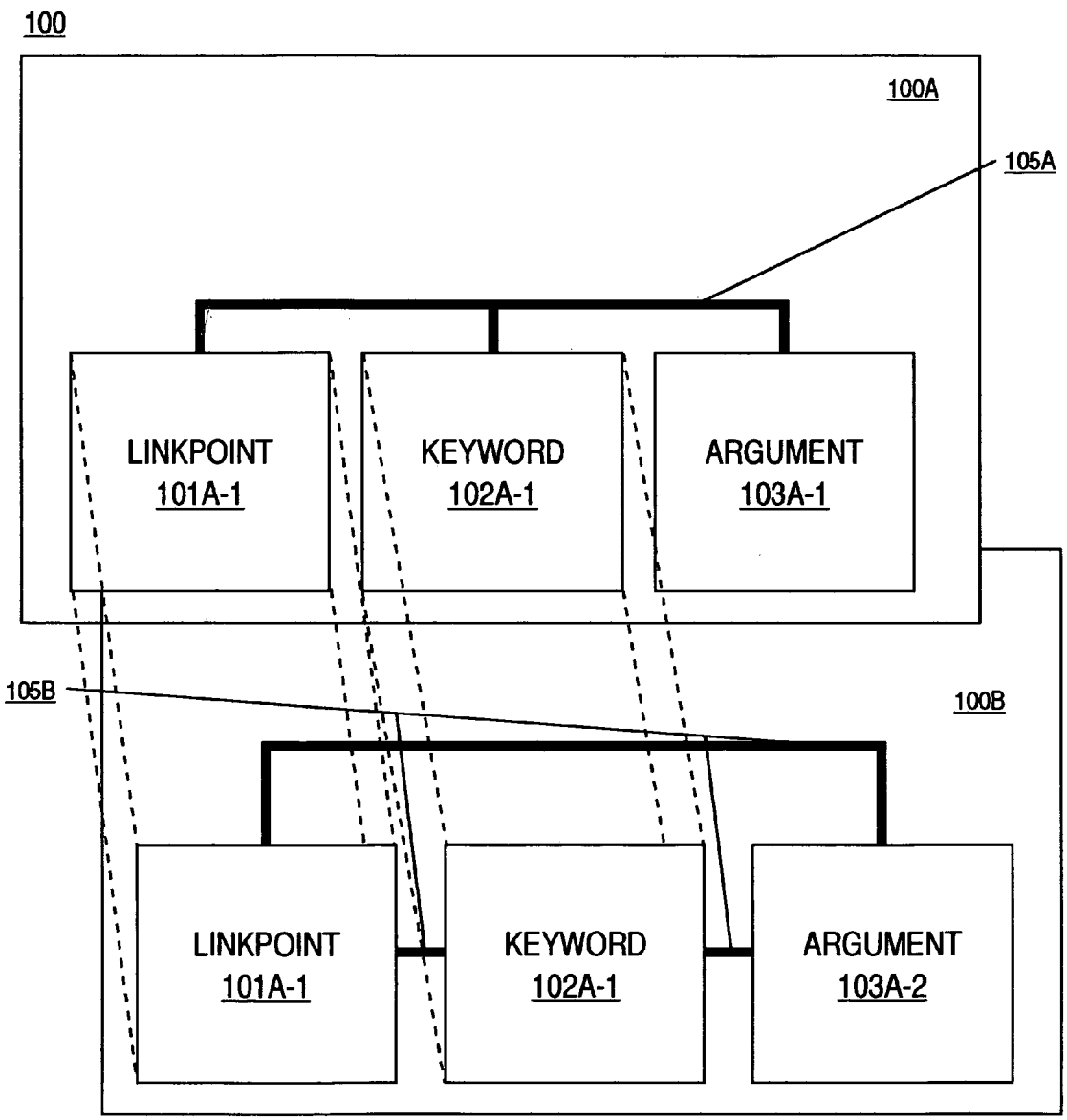
FIG. 1A is a block diagram depicting the syntactic construction of and relationship between Command Line Interface command variants, in accordance with one embodiment of the present invention.

In the following detailed description of the present invention, numerous specific details are set forth in order to provide a thorough understanding of the present invention. However, it will be recognized by one skilled in the art that the present invention may be practiced without these specific details or with equivalents thereof. In other instances, well known methods, procedures, components, and circuits have not been described in detail as not to unnecessarily obscure aspects of the present invention.

Notation and Nomenclature

Some portions of the detailed descriptions, which follow, are presented in terms of procedures, steps, logic blocks, processing, and other symbolic representations of operations on data bits that can be performed by computer systems. These descriptions and representations are used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "annotating" or "calling" or "categorizing" or "communicating" or "compiling" or "clarifying" or "creating" or "displaying" or "documenting" or "generating" or "networking" or "parsing" "performing" or "printing" or "processing" or "reading" or the like, refer to the action and processes of a computer system, or similar electronic computing device, that manipulates and transforms data represented as physical, e.g., electronic quantities within the communications and computer systems' registers and memories into other data similarly represented as physical quantities within the computer system memories or registers or other such information storage, transmission, or display devices.

The present invention is discussed primarily in the context of Command Line Interface of computer operating systems, wherein the operating systems and computers are engaged principally in internetworking. However, it is appreciated that the present invention is not limited to Command Line Interface, nor to IOS™ or other internetworking operating systems, nor to routers or other computers devoted to internetworking. On the contrary, the present invention may be used with other types of code, and deployed for use in other operating systems, and on computers engaged in other application, including but not limited to UNIX systems, personal computers, and a plethora of other functionalities.

Exemplary Command Structure

Exemplary Commands

With Reference to FIG. 1A, the relationship 100 between, and the construction of Command Line Interface command variants 100A and 100B, in accordance with one embodiment of the present invention. The syntactic structure of a single command amenable to the operations of an embodiment of the present invention may be explained by reference to either command variant 100A or 100B; their structures are analogous, and their differences will be discussed with reference to command variants, infra. For the sake of brevity and clarity, however, the operation of a single command amenable to the operations of an embodiment of the present invention will be explained with reference only to command variant 100A, which will be referred to in the preliminary discussion as command 100A.

A command, e.g., command 100A, is a syntactic unit starting with a linkpoint, e.g., linkpoint 101A, and containing, after the linkpoint, an arbitrary number of required and optional keywords, e.g., 102A-1, and arguments, e.g., 103A-1. A linkpoint, e.g., linkpoint 101A-1, is the first keyword in a command. A keyword, e.g., keyword 102A-1, is a reserved word. An argument, e.g., argument 103A-1, is a parameter, which may be variable, and which may be numerical.

In the present embodiment, command 100A, exemplary of Command Line Interface commands, contains syntactic constructs which include, but are not limited to, linkpoint 101A-1, keyword 102A-1, and argument 103A-1. Command 100A requires documentation, in its entirety. Aspects of a command, such as usage, purpose, history, related commands, and default may be documented. Further, certain of its syntactic constructs must also be documented. Additionally, command 100A has an underlying overall syntactic structure, into which is embedded syntactic interrelationship 105A.

Syntactic interrelationship 105A forms a logical interworking within the command structure between the syntactic constructs, e.g., between linkpoint 101A-1, keyword 102A-1, and argument 103A-1, as well as any other syntactic constructs command 100A may subsume, in the present embodiment. Within any particular command, the syntactic interrelationship, e.g., command 100A syntactic interrelationship 105A, will be rigid, e.g., constant, obvious, and intentional. This, notwithstanding the fact that certain of the syntactic constructs, e.g., argument 103A-1, may be flexible.

Linkpoint 101A-1 is typical of linkpoints, which identify and describe commands. In the present embodiment, linkpoint 101A-1 identifies and describes command 100A. Linkpoint 101A-1 contains the first word, or words, of the name of command 100A. Further, linkpoint 101A-1 describes the type of command characterizing command 100A. The command identification and description Linkpoint 101A-1 provides command 100A may categorize a position for the command in a hierarchical structure of command potency. In an exemplary internetworking operating system such as IOS™, the position of command 100A in such a hierarchy, as defined by linkpoint 101A-1, may privilege the command's implementation to, for example, configuring a router. Conversely, the position of command 100A, defined by linkpoint 101A-1, may limit the command's application to, for example, routine functions (e.g., review and general housekeeping). Further, each command has a particular denoted privilege which delineates the level of work that the command can perform. For example, in IOS™, commands of privilege 'root' may be able to modify system tables, while those of privilege 'user' are generally only able to modify user data.

Keyword 102A-1 typifies reserved words, which have special meanings ordinarily applied in control statements and similar contexts, and restricted in use to in certain, predefined circumstances. Keyword 102A-1 defines the province of command 100A, and correspondingly gives the command its functionality. Keyword 102A-1 is constant and unchangeable in the context of using the command, or in generation of command file documentation, in the present embodiment; e.g., no user or documentation editing of the keyword may occur. Keyword 102A-1 requires documentation generation. Keywords, e.g., keyword 102A-1 may be of an optional, required, or combination optional character. For keywords, what must be documented is the keyword description. No name documentation is required for keywords because a keyword may only have one name. Keywords have no default values.

In the present embodiment, argument 103A-1, also requiring documentation, may be an independent variable used with keyword 102A-1 to facilitate specific operations, specified by command 100A, as a whole. The value of argument 103A-1 may be variable, and may be specified by a user. The value of argument 103A-1 may be numerical.

Each argument, e.g., argument 103A-1, has a defined type, such as numeric, range of numeric, string, etc. For example, argument 103A-1 may be defined as type 'numeric, range <1–256>'. A user must specify a number from 1 to 256 for that argument.

Argument 103A-1 requires documentation for at least two of three aspects, with the third aspect an optional one.

The first argument 103A-1 aspect which must be documented is its name. The name of argument 103A-1 is what the argument is called in the syntax of command 100A.

The second argument 103A-1 aspect requiring documentation is the description. The description of argument 103A-1 announces what the argument is used for.

A third, and optional aspect of argument 103A-1 is the default. A default identifies what the argument's value is, in the absence of specification of another value by a user. Not all arguments have default values. If an argument has a default value, it will be documented.

Arguments, e.g., argument 103A-1 may be of an optional, required, or combination optional character.

Command variants may exist which underscore the need to document them independently of the initial command. A command variant, e.g., command variant 100B, is another command starting with the same words as the first command, e.g., 100A; e.g., the linkpoints of the variants are identical. In the particular CLI of the present embodiment, each command file defines a command and may further define several variants.

In the present embodiment, command 100B is a variant of command 100A. Command variants 100A and 100B share a relationship 100 as follows. Variant 100B has much the same syntactic structure as variant 100A. Variant 100B contains syntactic constructs which include, but are not limited to, linkpoint 101A-1, keyword 102A-1, and argument 103A-2. Linkpoint 101A-1 and keyword 102A-1 are identical in command variant 100B to the linkpoint 101A-1 and keyword 102A-1 in command variant 100A. Command variants, e.g., 100A and 100B share identical linkpoints and may share some or all keywords.

Argument 103A-2 may be identical in its entirety to the corresponding syntactic construct 103A-1 in command variant 100A. However, arguments in individual command variants may differ. For example, argument 103A-2 in command variant 100B may differ from argument 103A-1 in command variant 100A.

Command variant 100B also requires documentation, in its entirety, as do certain of its individual syntactic constructs. Aspects of each variant, such as usage, purpose, history, related commands, and default may also be documented. Additionally, command variant 100B has an underlying overall syntactic structure, into which is embedded syntactic interrelationship 105B.

Syntactic interrelationship 105B forms a logical interworking within the command structure between the syntactic constructs, e.g., between linkpoint 101A-1, keyword 102A-1, and argument 103A-2, as well as any other syntactic constructs command variant 100B may subsume, in the present embodiment. Within any particular command, the syntactic interrelationship, e.g., syntactic interrelationship 105B for command variant 100B, will be rigid, e.g., constant, obvious, and intentional, and reflects the command's syntax. This, despite the fact that certain of the syntactic constructs, e.g., argument 103A-2, may be flexible, with a user-defined value, in accordance with the argument's type.

As FIG. 1A depicts, syntactic interrelationship 105B is different in some certain discernible aspects from syntactic interrelationship 105A in command variant 100A. Thus, the underlying overall syntactic structures embedding syntactic interrelationships differ between variants, e.g., each command variant has its own, unique command syntax, requiring documentation. For example, in the present embodiment, the underlying overall syntactic structures of 100A and 10B, embedding syntactic interrelationships 105A and 105B, respectively, differ. This marks a syntactic demarcation from command 100A, which marks 100B as a variant of command 100A, notwithstanding that much of its syntactic structure, e.g., corresponding keywords 102A-1 and linkpoints 101A-1 are identical, and corresponding arguments 103A-1 and 103A-2, may or may not be identical. Command variants, e.g., 100A and 100B share the first few syntactic structures, e.g., linkpoints and keywords, and may or may not share arguments; yet both continue with new, different, and distinct syntax.

Exemplary Command Files and Documentation Content Files

In the documentation required for all commands, e.g., command variants 100A and 10B, keywords, arguments, and the overall command must be documented. In the present embodiment, documentation content may be provided by the command's syntax and mode, 'help' fields on the command, and separate documentation content files.

Figure 1B:
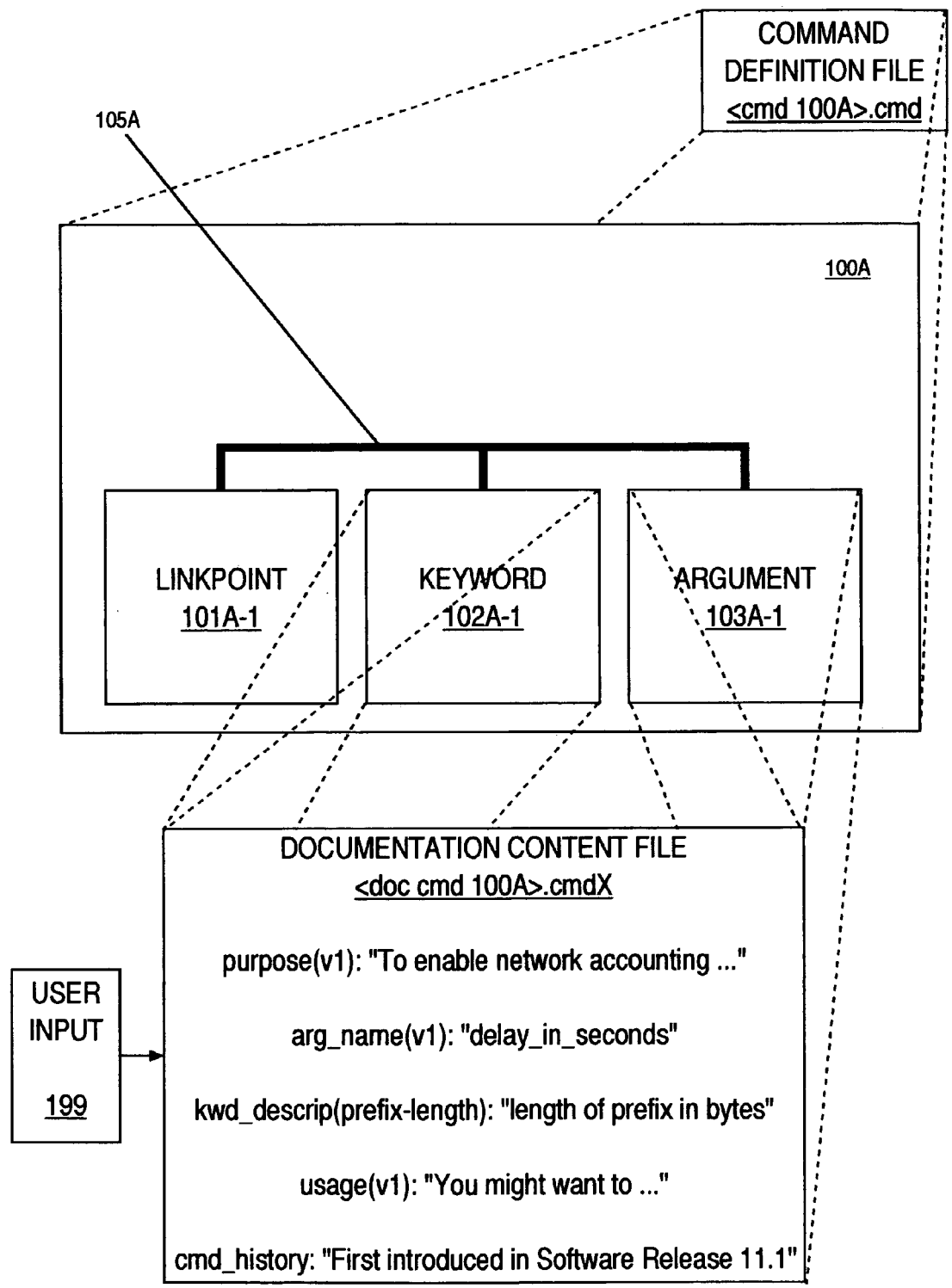
FIG. 1B is a block diagram depicting the syntactic structure of a set of Command Line Interface command variants and their documentation content, in relation to respective command specification and document content files, in accordance with one embodiment of the present invention.

With reference to FIG. 1B, the syntax of a command, e.g., command 100A, is defined in the present embodiment in command definition file (cmd file) <cmd_100A>.cmd, within Command Line Interface or analogous operant code. A command definition file, in the present embodiment, may be designated <cmd_name>.cmd. Command definition file <cmd_100A>.cmd contains a syntax specification, by which the syntax of command 100A is delineated.

As depicted in FIG. 1B, command definition file <cmd_100A>.cmd reflects its respective command 100A syntactically with perfect correspondence. The syntax within command definition file <cmd_100A>.cmd itself has constructs for defining all of the syntactic constructs, e.g., linkpoints, keywords, and arguments, of its corresponding command, 100A. In addition, in the present embodiment, information in the command definition file <cmd_100A>.cmd defines argument types and ranges, and the characteristics of keywords and arguments, e.g., optional, required, and combination optional. The contents of command definition file <cmd_100A>.cmd are a programming product; they are not amenable to any user input.

In the present embodiment, the command definition file <cmd_100A>.cmd may have an associated, corresponding documentation content file, e.g., <cmd_100A>.cmdX. Documentation content file <cmd_100A>.cmdX contains documentation content for the corresponding command definition file, e.g., <cmd_100A>.cmd. A documentation content file, in the present embodiment, may be designated <cmd_name>.cmdX.

In the present embodiment, a documentation content file, e.g., <cmd_100A>.cmdX, provides documentation content for the various syntactic structures of the command, e.g., keywords and arguments, for the command, itself, and for contents of the command definition file. Documentation content file <cmd_100A>.cmdX is responsive to an input 199 from operating system engineers/technical writers. In the present embodiment, annotations, changes, and documentation content may be added to the documentation content files. Advantageously, this enhances the usefulness of this embodiment and further, promotes localization of this embodiment to languages other than English, because documentation content is in a separate file.

In the present embodiment, documentation content (doc-content) file <cmd_100A>.cmdX provides documentation content for command 100A. Doc-content file <cmd_100A>.cmdX provides documentation for argument 103A-1, keyword 102A-1, and for the overall command 100A. As command file syntax defines and describes the syntax of the Command Line Interface commands, in the present embodiment, the documentation within doc-content file <cmd_100A>.cmdX may specify documentation for keywords, arguments, and the entire command.

In the present embodiment, doc-content file <cmd_100A>.cmdX specifies documentation content for argument 103A-1. The documentation provided includes the argument name, the argument description, and the argument default.

The name is what argument 103A-1 is called in the syntax of command 100A. The description is a statement relating to what the argument is used for.

The default states a value for the argument, in the absence of specification of another value by a user.

Doc-content file <cmd_100A>.cmdX specifies documentation content for keyword 102A-1. Specifically, in the present embodiment, doc-content file <cmd_100A>.cmdX specifies the description of the keyword 102A-1.

For the overall command 100A, doc-content file <cmd_100A>.cmdX provides documentation of the command usage, purpose, history, related commands, and examples. In the present embodiment, this documentation may be described as follows.

"Usage" may provides documentation of command usage scenarios and interactions with other commands.

"Purpose" may document definition and description of the operation performed by a command, specifying both configuration and execution.

"History" may provide documentation of the software release in which the command originated.

"Related commands" may document reference to other commands performing functions in a related, or similar area.

Figure 7:
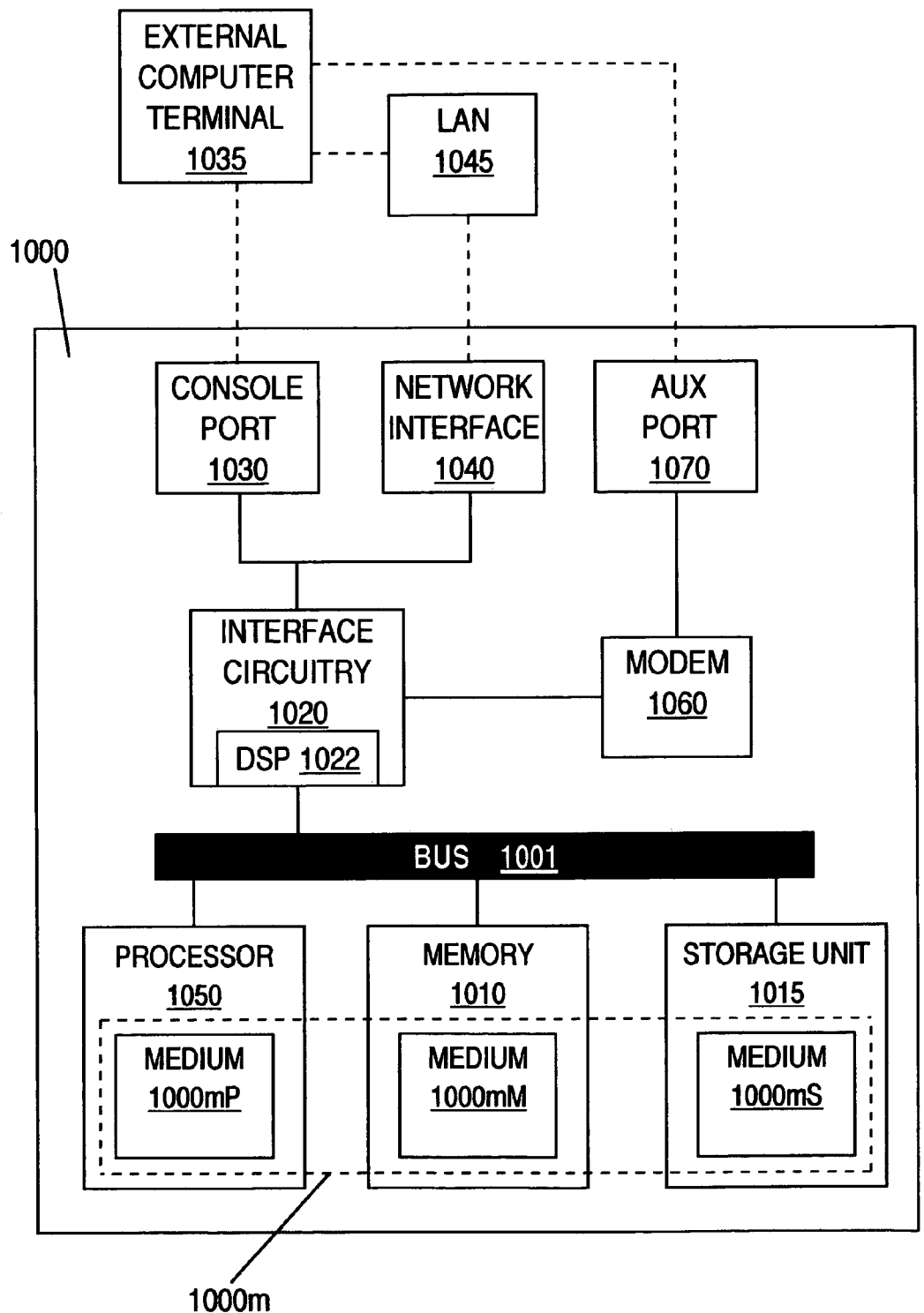
FIG. 7 is a block diagram depicting a computer system for reading computer readable code, including code defining operating system CLI commands, and for implementing a process of generating documentation, in accordance with one embodiment of the present invention.

"Example" may document a sample usage of command syntax and a sample response of the computer under operational control, e.g., a router (e.g., computer system 1000, FIG. 7).

The description of this documentation, as depicted in FIG. 1B, may be summarized in exemplary descriptive headings by reference to Table 1, below.

TABLE 1

EXEMPLARY DOCUMENTATION CONTENT FILE
<cmd_100A>.cmdX

| Descriptive Heading | Exemplary Documentation Content |
|---|---|
| purpose(v1): | "To enable network accounting . . ." |
| arg_name(v1): | "delay_in_seconds" |
| kwd_descrip(prefix length): | "length of prefix in bytes" |
| usage(v1): | "You might want to . . ." |
| cmd_history: | "First introduced in Software Release 11.1" |

With reference to Table 1, above, note that "v" refers to a variant number, "kwd_descrip" represents the keyword description, and "cmd_history" denotes the command history. Advantageously, the present embodiment is accessible to an input from operating system engineers/technical writers, who may input any documentation within the doc-content fields which may be of particular usefulness to them. The doc-content may be in English, or in any other language. This expediency of the present embodiment promotes localization to languages other than English.

Figure 2:
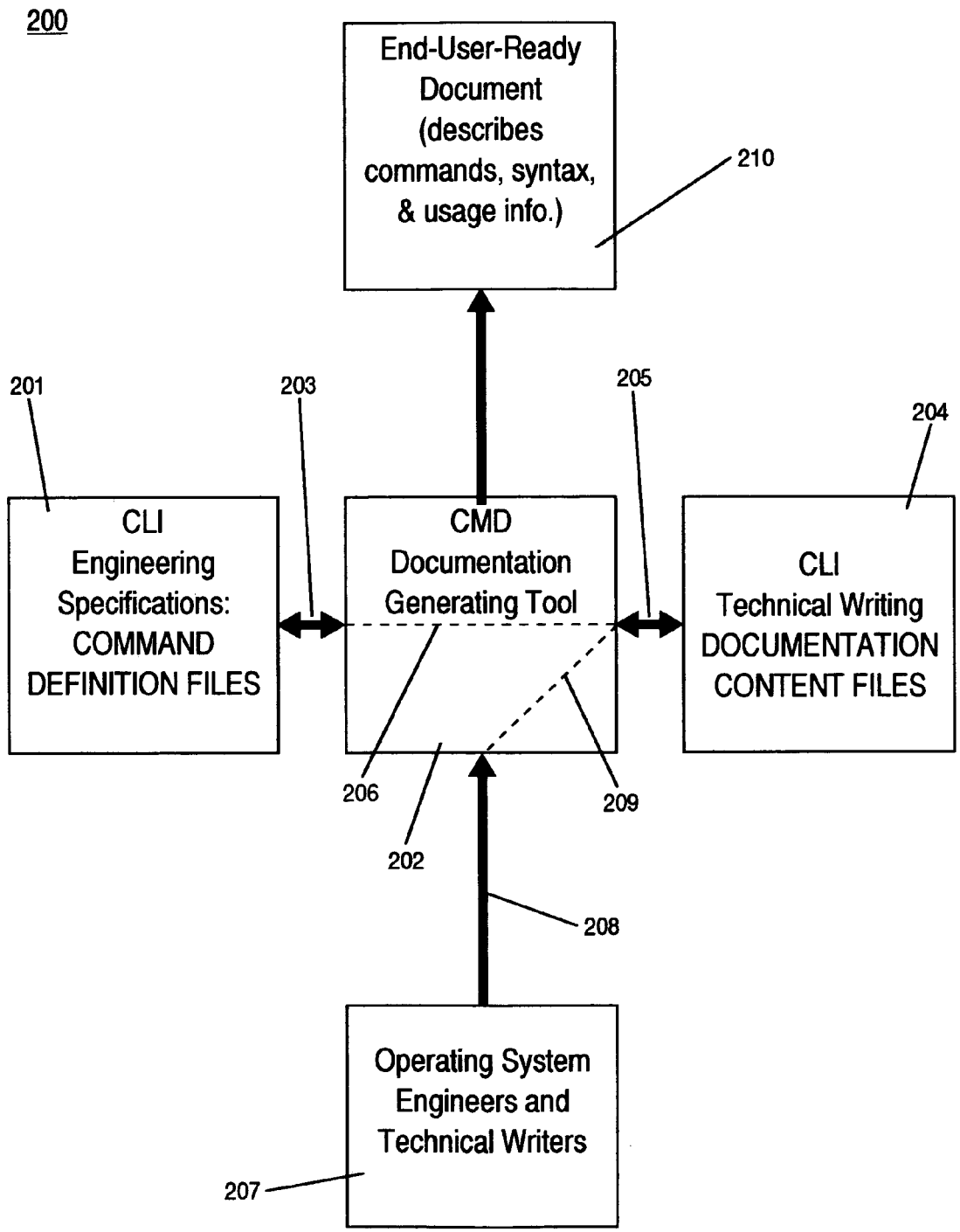
FIG. 2 is a block diagram depicting the interworking relationships between command specifications, command content documentation, Command Line Interface operating system user applications, and the command file documentation tools, in accordance with one embodiment of the present invention.

Collectively, this documentation forms a corpus of documentation content, e.g., a documentation content file (e.g., <cmd_100A>.cmdX; 204, FIG. 2). Documentation content file is, may, in accordance with one embodiment of the present invention, be worked, with the command definition file, e.g., <cmd_100A>.cmd, by a documentation tool (e.g., 202, FIG. 2) to generate useful documentation.

With reference to FIG. 2, an interworking relationship 200, in accordance with one embodiment of the present invention, exists between command specifications 201 and documentation content files 204 (e.g., <cmd_100A>.cmdX, FIG. 1B) by a command documentation generating tool 202, and Operating System Command Line Interface user interaction 207.

In the present embodiment, command definition files (e.g., <cmd_100A>.cmd, FIG. 1B), provide Command Line Interface (CLI) engineering specifications 201, and delineate these specifications. These command definition files are the entities that specify and define the CLI commands. They are programming products; engineering specifications not amenable to any user input.

Documentation content files 204 (e.g., <cmd_100A>.cmdX, FIG. 1B) may also embody information gleaned from software engineering specifications. However, documentation content files 204 may also contain documentary information, as inputs from engineers implementing those commands, and added by technical writers. Such documentary information may include descriptions of keywords (e.g., keyword 102A-1, FIG. 1A) and arguments (e.g., arguments 103A-1 and 103A-2, FIG. 1A). It may also include argument names and defaults. Further, it may contain information on the overall commands (e.g., command 100A, FIGS. 1A and 1B), including usage, purpose, history, related commands, and example (e.g., doc-content file <cmd_100A>.cmdX, FIG. 1B; Table 1).

In the present embodiment, command documentation generating tool 202 receives information about the syntax of commands (e.g., command 100A, FIGS. 1A and 1B) from Command Line Interface engineering specification 201 command definition files (e.g., <cmd_100A>.cmd, FIG. 1B), via pathway 203.

Documentation content is received by command documentation generating tool 202 from documentation content files 204 (e.g., <cmd_100A>.cmdX, FIG. 1B) via programming pathway 205, and from the command definition file 201 via pathway 203.

Engineering specification content may be added to document content files 204 using the documentation tool 202 via pathway 206 internal to command documentation tool 202. Pathway 206 also permits command documentation generating tool 202 to add documentation content to command documentation content files (e.g., <cmd_100A>.cmdX, FIG. 1B), e.g., to add argument names.

Documentation of specific applications may be annotated by operating system engineers/technical writers via programming pathway 208. Adding certain engineering/technical writing annotations to documentation content files (e.g., <cmd_100A>.cmdX, FIG. 1B) may be enabled in one embodiment via pathway 209, internal to command documentation tool 202.

In the present embodiment, command documentation tool 202 produces, via pathway 211, useful, meaningful documents 210. Documents 210 may include webpages generated in HyperText Markup Language (HTML), customized tags generated in Extensible Markup Language (XML), UNIX manpages, and other useful variants.

In one embodiment an HTML file is generated, the HTML file formally derived from information in a command definition, which includes a specific command name. The present embodiment enables utilization of the HTML files by other interface applications.

Exemplary Processes

Figure 3:
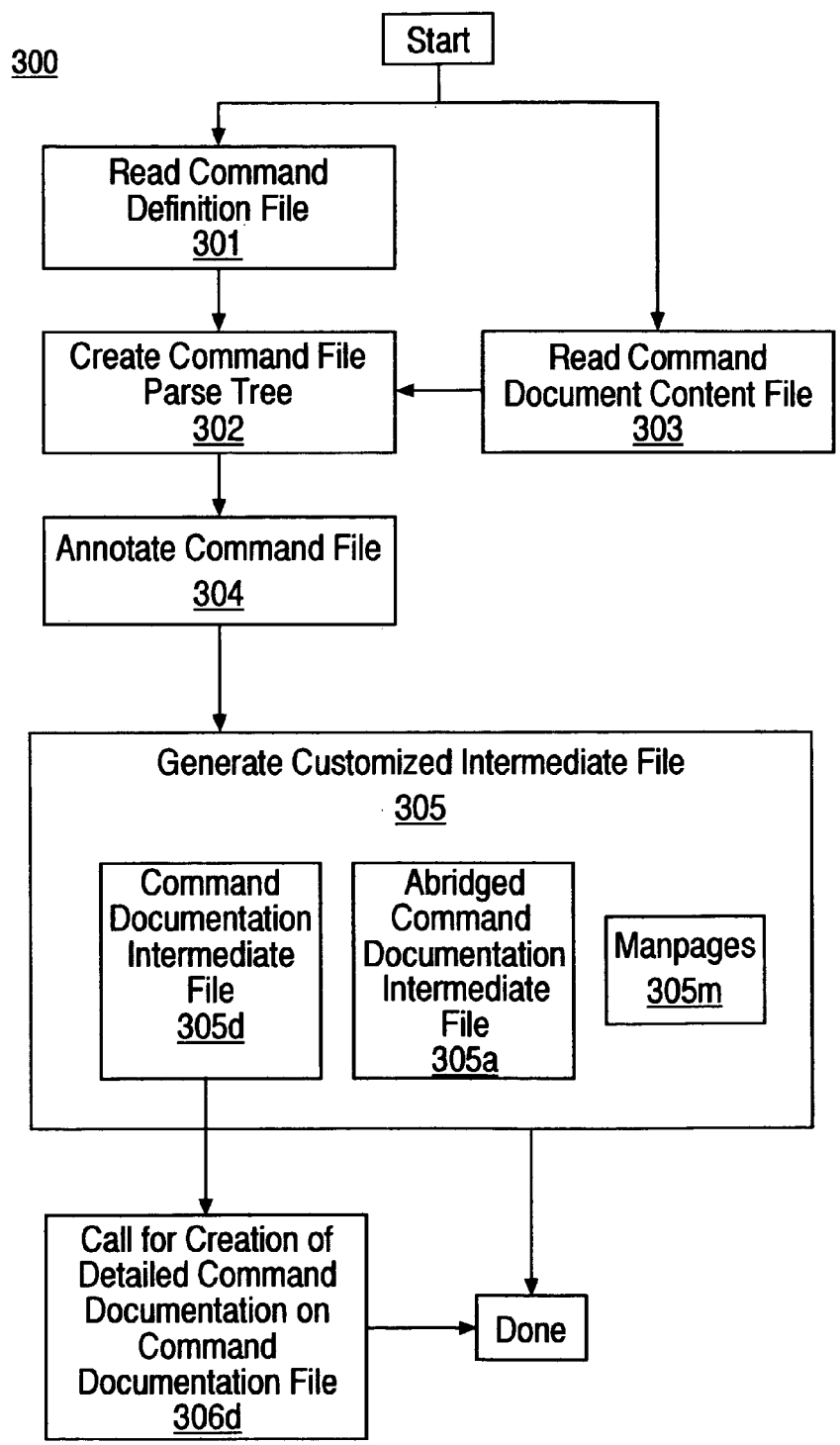
FIG. 3 is a flow chart depicting the steps in a process for generating a parse tree which has added documentation annotations and a customized intermediate file, in accordance with one embodiment of the present invention.

With reference to FIG. 3, the steps in a generalized process 300 for generating documentation in accordance with one embodiment of the present invention enable customized intermediate representations. Starting at step 301, a command documentation generation tool (e.g., documentation generation tool 202, FIG. 2) reads command definition files (e.g., cmd files <cmd_100A>.cmd, FIG. 1B; 201, FIG. 2).

Upon reading the command file, the documentation generation tool of the present embodiment parses the command file syntactic structure and correspondingly creates a parse tree, step 302.

Effectively simultaneous with reading the command file (step 301), the document generation tool of the present embodiment also reads the command documentation content file (e.g., doc content file 204, FIG. 2; <cmd_100A>.cmdX, FIG. 1B), step 303.

Upon construction of the parse tree, the documentation generation tool creates an annotated command documentation intermediate file from the parse tree, utilizing information from the documentation content file, step 304. Importantly, in the present embodiment, user-provided content and generated documentation content is kept strictly separated from the command definition files. This advantageously obviates cluttering command specifications with long documentation content. Further, this advantageously facilitates localization into languages other than English, because only the doc-content file is translated.

From the annotated command documentation file, the documentation generation tool generates a customized intermediate file, step 305. In one embodiment, the intermediate file may be generated as a web-ready intermediate command documentation file in HTML, step 305*d*. In the present embodiment, this intermediate command documentation file 305*d* may subsequently be applied to generating HTML webpages.

In another embodiment, the intermediate report may be generated as an abridged intermediate command documentation file, step 305*a*. In yet another embodiment, the intermediate file may be generated as manpages, step 305*m*. At this point, process 300 may be complete.

However, in an alternative embodiment wherein the intermediate file was generated as an intermediate command documentation file (step 305*d*), the documentation generation tool may call for the creation of detailed command documentation, step 306. In this alternative embodiment, upon calling for the detailed command documentation (step 306), process 300 is complete.

In one embodiment, a network extended help utility extracts the logic used to traverse the command parse tree and re-implements it on board a host operating system. In one embodiments, the operating system may be IOS™. In another embodiment, the operating system may be another internetworking operating system. In another embodiment, the operating system may be UNIX. In another embodiment, the host system may be any functional operating system. In yet another embodiment, the host operating system may be any feasible operating system. In the present embodiment, the network extended help utility thus enables traversing of actual parse chains in CLI.

In the present embodiment, the extended help utility may create a unique file path and file name for HTML, XML, or textual output using command information stored in the source code. Advantageously, this enables the network extended help utility to derive an identical file path and file name using less logic resources than would be required by storing the file path and file name on the host system (e.g., computer system 1000, FIG. 7), saving memory (e.g., memory 1010, FIG. 7) space and related resources. This enables the present embodiment to be implemented on very small systems and systems with memory constraints.

In the present embodiment, the only generated document pages that would be addressable would be those for which command information is already present in the host operating system via the extended help utility. The present embodiment thus advantageously provides a tailored view of the command line documentation specific to the host operating system running the extended help utility. This notwithstanding the applicability of the embodiment to operating systems of any type.

Further, the present embodiment extends the CLI and web-based configuration interfaces. In response to a user command, the extended help utility traverses the parse tree created (e.g., step 302) to a current context in a command executive. Thus, in the present embodiment, the extended help utility becomes a context-sensitive help system, reflective of a current configuration state of the CLI. In one embodiment, path names and file names thus generated may be handed to a standard browser. In an alternative embodiment, path names and file names thus generated may be handed to a derivative/minimal browser on board a host system (e.g., computer system 1000, FIG. 7). In either embodiment, network path names and host server names may be pre-pended accordingly.

The present embodiment thus advantageously causes a user system to become a context sensitive help system for accessing on-line documentation. Further, combined with other embodiments of the present invention, the present embodiment eliminates distinction between user interface and on-line documentation, effectively combining them into a single service.

In one implementation of the present invention, the output name and file name of generated content is derived from information contained in command line source descriptions. An embodiment that is able to programmatically generate the same file name and path name from final parse chains on board a host system (e.g., computer system 1000, FIG. 7) thus acquires direct access to the generated content reduced storage demands on memory (e.g., memory 1010, FIG. 7). Thus, the present embodiment enables a documentation output to support development of a network extended user interfaces, advantageously augmenting local functionality with on-line documentation.

Figure 4:
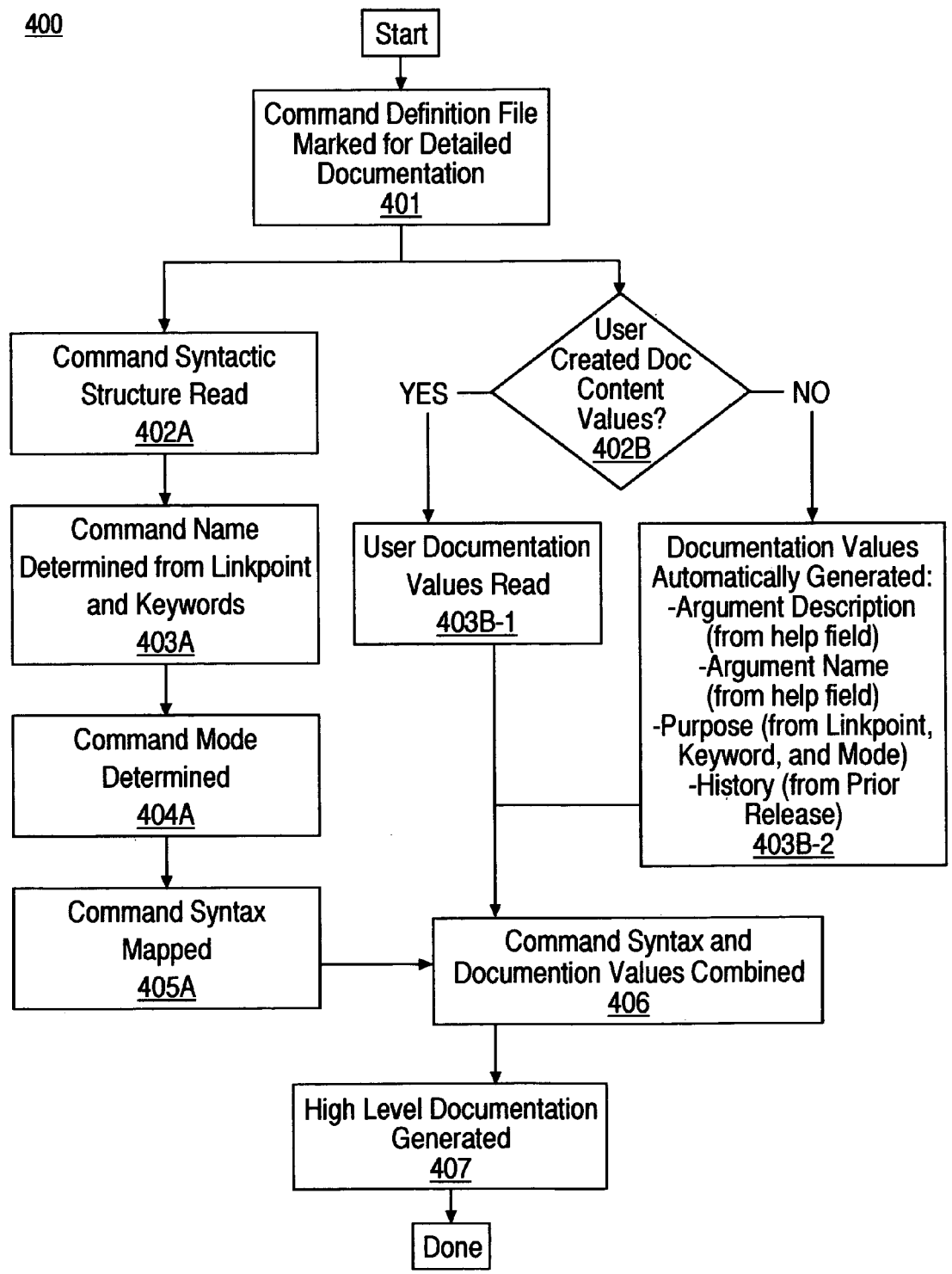
FIG. 4 is a flow chart depicting the steps in a process for generating high level documentation, and other customized documents, in accordance with one embodiment of the present invention.

With reference to FIG. 4, in accordance with one embodiment of the present invention, the steps in a process 400 enable generation of customized, intermediate representations, depicting greater detail than the shown in the generalized process 300 (FIG. 3). Starting at step 401, a command definition file (e.g., <cmd_100A>.cmd, FIG. 1B) is marked, e.g., selected for detailed command documentation by a command documentation generation tool (e.g., documentation generation tool 202, FIG. 2).

In step 402A, the command syntactic structure is read from the command file (e.g., <cmd_100A>.cmd, FIG. 1B). From the command syntax, the command name is determined by reference to the command linkpoint (e.g., linkpoint 101A-1 FIGS. 1A and 1B), the first word or group of words in a command (e.g., command 100A, FIGS. 1A and 1B), and some keywords (e.g., keyword 102A-1, FIGS. 1A and 1B), step 403A. The command mode is determined, step 404A. Then, in step 405A, the complete command syntax is delineated.

In one embodiment, essentially simultaneously with reading the command syntactic structure (step 402A), a command documentation generation tool (e.g., documentation generation tool 202, FIG. 2) determines if user-created document values exist in the command documentation content file (e.g., <cmd_100A>.cmdX, FIG. 1), step 402B. If so, the user document values are read and applied, step 403B-1.

If no user-created document values exist in the command documentation content file (e.g., <cmd100A>.cmdX, FIG. 1B), the command documentation generation tool automatically generates values, step 403B-2. Argument names and descriptions are generated by reference to a 'help' field in the command syntax. Purpose may be generated by reference to the command linkpoint, keywords, and mode. History may be generated by reference to command names in prior software releases. Related commands may be generated by reference to the names of prior command variants (e.g., command variant 10B, FIG. 1A).

At this point, the command syntactic structure and the documentation values, either user-created or automatically generated, are combined, step 406. From this combination, in step 407, intermediate files are generated (e.g., as in step 305, FIG. 3).

In one embodiment, webpage documents may be created by generation of a web-ready intermediate file in HTML (e.g., step 305*d*, FIG. 3). In another embodiment, intermediate files are rendered as manpages (e.g., step 305*m*, FIG. 3). In another embodiment, abbreviated intermediate command documentation files are produced (e.g., step 305*a*, FIG. 3). These abbreviated intermediate files may be utilized, in one embodiment, by a command lister tool (e.g., process 500, FIG. 5) to generate user-ready, human readable lists of all CLI commands in a particular release of an operating system. In another embodiment, generation of other intermediate documentation may be enabled.

Figure 5:
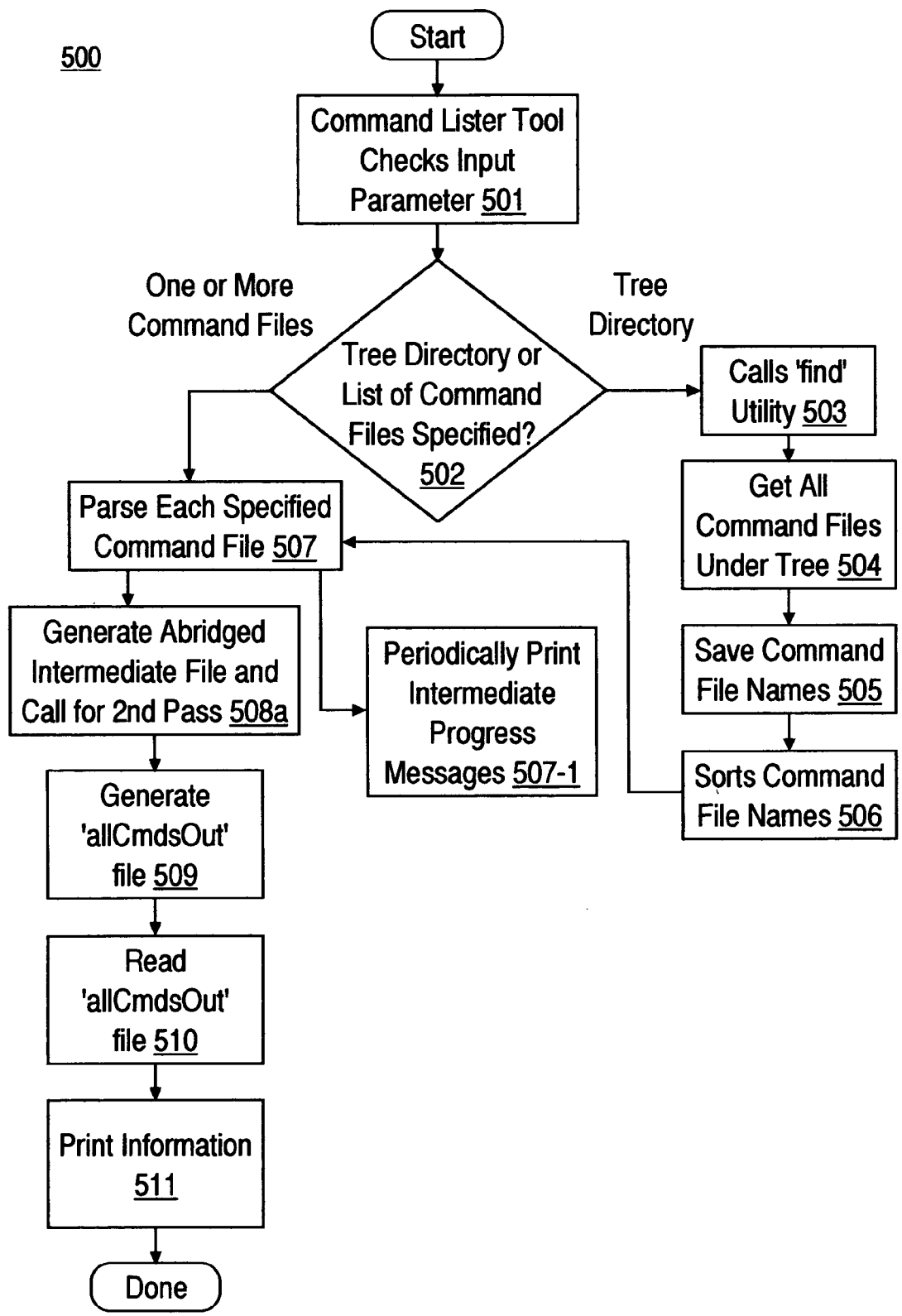
FIG. 5 is a flow chart depicting the steps in a process for generating human readable lists of the names and syntax's of all commands in a file or directory, in accordance with one embodiment of the present invention.
Figure 6:
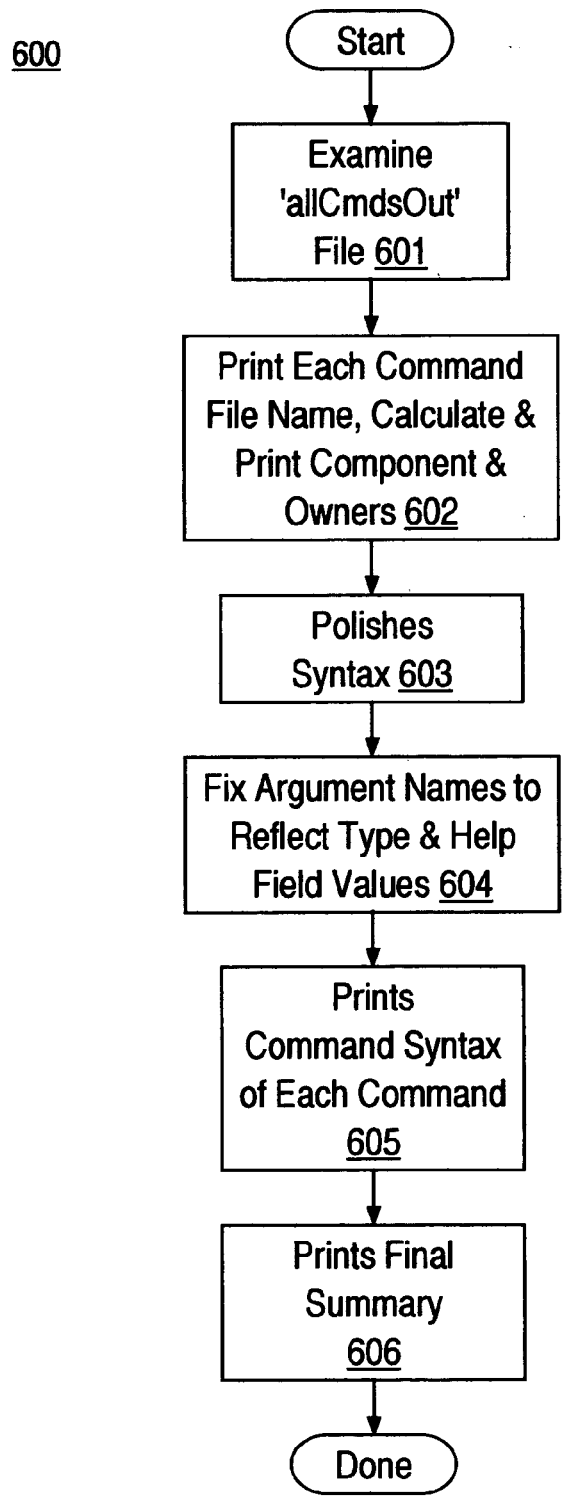
FIG. 6 is a flow chart depicting the steps in a process for generating and summarizing polished commands and syntax, in accordance with one embodiment of the present invention.

With reference to FIG. 5, the steps in a process 500 enable the generation of annotated lists of commands and file names, in accordance with one embodiment of the present invention. Starting at step 501, the command documentation generation tool (e.g., documentation generation tool 202 FIG. 2), in the present embodiment, assumes an "all commands" mode, and checks its input parameter specifying any command definition files (e.g., <cmd_100A>.cmd, FIG. 11B). In its all commands (all_cmds) mode, the documentation generation tool becomes a command lister tool, capable of generating user-ready, human-readable lists of all of the names and syntax for all commands in a directory or file.

In step 502, the command lister tool determines if a tree directory is specified. If a tree directory is specified, in one embodiment, a UNIX 'find' utility is called, step 503. In another embodiment, an analogous utility in a respective other operating system is contacted. The output of the find utility is used as a list of command files in the tree for the command lister tool, step 504.

In step 505, the command lister tool saves all command file names it obtains. The command lister tool then proceeds to sort the command file names, step 506.

If no tree directory was specified in step 502, or, alternatively, upon completion of step 506, the command lister tool proceeds to parse all specified command files, step 507.

During the parsing phase (e.g., step 507), intermediate progress messages are printed periodically, step 507-1.

Upon parsing each specified command file, the command lister tool generates an abridged intermediate file, step 508a. The abridged intermediate file may contain only tags for command syntax, mode, and privilege. In one embodiment, the tags are generated in Extensible Markup Language (XML).

In step 508, a second pass is called to initiate the generation of an output file. For each command file, a file name, and for each command in the command file, the command name, command syntax, privilege, and mode are combined to generate an 'all Commands Output' ('allCmdsOut') file, step 509. Command files may contain information reflecting the component, e.g., a modular constituent of the operating system, to which the command file belongs.

The command lister tool reads the allCmdsOut file, step 510.

Upon reading the allCmdsOut file (step 510), the command lister tool prints information, step 511. For each command file, the file name, component name, and component owner is printed. For each command in the command file, the command lister tool prints the command name, the command syntax, and the privilege and mode of the command.

When the printing of command and syntax information has been successfully executed (step 511), process 500 is complete.

In accordance with one embodiment of the present invention, the steps of a process 600 enable the documentation by printing of commands and syntax. Starting with step 601, the command lister tool examines allCmdsOut file (e.g., as generated in step 509, FIG. 5).

From the allCmdsOut file, the command lister tool prints each command file name and mode, calculating and printing the respective components and owners of each, step 602 (e.g., analogous to step 511, process 500, FIG. 5).

In step 603, the command lister tool prepares to polish the syntax of each command, and does so in the present embodiment, by fixing argument names to reflect their types and/or help field values, step 604.

The command lister tool then prints the command syntax, step 605.

Process 600 is completed upon successful printout of a summary, step 606. In the present embodiment, the summary may include the number of command files, the total number of commands, taking into consideration that there may be more than one command variant (e.g., 100A and 10B, FIG. 1A) in any or all files, and the names of incomplete commands.

In accordance with one embodiment of the present invention, a computer system 1000 and computer usable medium 1000m enables the generation of documentation content from operating system command specifications. With reference to FIG. 7, computer system 1000 includes a bus 1001 for communicating information, a central processor 1050 coupled with the bus 1001 for processing information and instructions, and a memory unit 1010 (e.g., random access memory and/or read only memory) and a data storage system 1015 coupled with the bus 1001 for storing information and instructions. Data storage system 1015 may be any magnetic and/or optical disc and drive/reader, or any other data storage device.

In one embodiment of the present invention, the processes described, including but not limited to generation of intermediate and high level documentation (e.g., Processes 300, 400, 500, and 600, FIGS. 3, 4, 5, and 6, respectively) may be executed by processor 1050, which may be an application specific integrated circuit (ASIC). Alternatively, these methods may be implemented by processor 1050 executing a program stored in memory 1010 and/or data storage system 1015. It is appreciated that computer system 1000 may implement the invention by combinations of these schemes, or by alternatives other than those pictured. It is appreciated that computer system 1000 can include other elements not shown. It is further appreciated that computer system 1000 may be constituted by any functional equivalent, or by any viable alternative architecture.

In the present embodiment, computer system 1000 may also optionally include host interface circuitry 1020 coupled to bus 1001. Host interface circuitry 1020 includes an optional digital signal processor (DSP) 1022 for processing data to be transmitted or data that are received via communications device 1060 or via console port 1030, or network interface 1040. Alternatively, processor 1050 can perform some or all of the functions performed by DSP 1022.

In the present embodiment, computer system 1000 may also optionally include a communications device 1060. Communications device 1060 may be a modulator/demodulator (MODEM). Communications device 1060 enables communication via an auxiliary port 1070.

In the present embodiment, computer system 1000 may be communicatively coupled with external computer terminal 1035, directly via console port 1030, or through network interface 1040, via external network 1045. External network 1045 may be a local area network (LAN), or any other feasible network configuration.

Computer system 1000 executes a program embodied in a computer readable medium 1000m which may be deployed as embodied to various degrees between processor 1050

(e.g., as 1000 mP), memory 1010 (e.g., as 1000 mM), and storage unit 1015 (e.g., as 1000 mS).

In summary, in accordance with an embodiment of the present invention, a method, system, and computer usable medium that can automatically generate human-readable command documentation from operating system command specifications is described. The present invention also provides a method, system, and computer usable medium for generating webpages and other transparent and readily accessible and applicable documents, readable by an end-user, from specified and generated document content. Further, the present invention provides a method, system, and computer usable medium which can accomplish the foregoing requirements, and which is compatible with and applicable to any operating system, and which is applicable to Command Line Interface as well as to other code. Further still, the present invention provides a method, system, and computer usable medium which can automatically generate dynamic end user documentation and promulgate current lists of user available commands in software releases from live command specifications, obviating the necessity of manual documentation generation. Yet further still, the present invention provides a method, system, and computer usable medium which accomplishes the foregoing requirements, while facilitating localization by implementing separation of documentation content from command specifications, without direct contact or interference with code.

In one embodiment of the present invention deployed in a computer system implementing an operating system, command specifications are generated by automatically parsing command files and command documentation content for a command syntactic structure, automatically creating a parse tree from the structure, automatically annotating the parse tree with documentation annotations, and automatically compiling the annotations into an intermediate file. In one embodiment, the operating system, the CLI of which is being documented, may be an internetworking operating system. In one embodiment, the internetworking operating system may be Cisco Systems' Internetworking Operating System™ (IOS™). In another embodiment, the internetworking operating system may be progeny of IOS™. Alternatively, in another embodiment, the operating system may be any operating system utilizing commands. In one embodiment, further documentation is generated in high level format, such as HyperText Markup Language (HTML) and Extensible Markup Language (XML). In one embodiment, the documentation is performed for the Command Line Interface of said operating system. In one embodiment, the documentation generation may involve automatically documenting commands, command variants, said syntactic structure, command files, automatically categorizing the commands, command variants, syntactic structure, and said command files, automatically clarifying variations in the commands, command variants, syntactic structure, and command files between releases of said operating system, and displaying commands, command variants, syntactic structure, and command files. In one embodiment, the documentation generation may include generating command names and generating command syntax. In one embodiment, the documentation generation may create names for command arguments.

An embodiment of the present invention, a method, system, computer readable medium for generating command documentation, is thus described. While the present invention has been described in particular embodiments, it should be appreciated that the present invention should not be construed as limited by such embodiments, but rather construed according to the following claims.

What is claimed is:

1. In a computer system that implements an operating system, a method for generating documentation from a command specification of said operating system, said method comprising:

parsing command files and command documentation content files for a syntactic structure wherein said computer system performs an internetworking function for a network;

creating a parse tree from said syntactic structure wherein an extended help utility associated with said network extracts logic for traversing said parse tree and re-implements said logic on said operating system and wherein said parse tree is traversed in Command Line Interface;

annotating said parse tree with documentation annotations;

compiling said annotations into a first documentation file, wherein said documentation annotations comprises an intermediate representation of said syntactic structure and wherein said command documentation is separate from said command specification; and automatically generating a second documentation file, wherein said second documentation file comprises a high level format wherein said high level format comprises transparent human readable content that is localized in one or more of English and a non-English writable human language.

2. The method as recited in claim 1 wherein said second documentation file comprises dynamic end user documentation and a current list of user available commands.

3. The method as recited in claim 2 wherein said list is generated from a live command specification.

4. The method as recited in claim 3 wherein said wherein said second documentation file comprises one or more of a web page, a manual page, and an abridged documentation information file wherein said abridged documentation information file is usable with a software tool.

5. The method as recited in claim 3 wherein said high level format comprises HyperText Markup Language.

6. The method as recited in claim 3 wherein said high level format comprises Extensible Markup Language.

7. The method as recited in claim 1 wherein said documentation is performed within the Command Line Interface of said operating system.

8. The method as recited in claim 1 further comprising:

documenting commands, command variants, said syntactic structure, and said command files;

categorizing said commands, said command variants, said syntactic structure, and said command files;

clarifying variations in said commands, said command variants, said syntactic structure, and said command files between releases of said operating system; and displaying said commands, said command variants, said syntactic structure, and said command files.

9. The method as recited in claim 8 wherein said documenting, said categorizing, said clarifying, and said displaying are performed automatically.

10. The method as recited in claim 8 further comprising:

generating command names;

generating command syntax; and generating names for command arguments.

11. The method as recited in claim 10 wherein said generating actions are performed automatically.

12. A computer system comprising:
  a bus wherein said computer system performs an internetworking function for a network;
  a memory coupled to said bus; and
  a processor coupled to said bus and implementing an operating system, said processor performing a method for generating documentation from command specifications of said operating system, said method comprising:
    parsing command files and command documentation content files for a syntactic structure;
    creating a parse tree from said syntactic structure wherein an extended help utility associated with said network extracts logic for traversing said parse tree and re-implements said logic on said operating system;
    annotating said parse tree with documentation annotations;
    compiling said annotations into a first documentation file, wherein said documentation annotations comprises an intermediate representation of said syntactic structure and wherein said command documentation is separate from said command specification; and
    automatically generating a second documentation file, wherein said second documentation file comprises a high level format wherein said high level format comprises transparent human readable content that is localized in one or more of English and a non-English writable human language.

13. The computer system as recited in claim 12 wherein said second documentation file comprises one or more of a web page, a manual page, and an abridged documentation information file wherein said abridged documentation information file is usable with a software tool.

14. The computer system as recited in claim 13 wherein said high level format comprises HyperText Markup Language.

15. The computer system as recited in claim 13 wherein said high level format is Extensible Markup Language.

16. The computer system as recited in claim 12 wherein said documentation is performed within the Command Line Interface of said operating system.

17. The computer system as recited in claim 12 wherein said method further comprises:
  documenting commands, command variants, said syntactic structure, and said command files;
  categorizing said commands, said command variants, said syntactic structure, and said command files;
  clarifying variations in said commands, said command variants, said syntactic structure, and said command files between releases of said operating system; and
  displaying said commands, said command variants, said syntactic structure, and said command files.

18. The computer system as recited in claim 12 wherein said method further comprises:
  generating command names;
  generating command syntax; and
  generating names for command arguments.

19. A computer usable medium having a computer readable program code embodied therein for causing a computer system to perform a method for generating documentation from command specifications of an operating system thereof, said method comprising:
  parsing command files and command documentation content files for a syntactic structure wherein said computer system performs an internetworking function for a network wherein an extended help utility associated with said network extracts logic for traversing said parse tree and re-implements said logic on said operating system;
  creating a parse tree from said syntactic structure;
  annotating said parse tree with documentation annotations;
  compiling said annotations into a first documentation file, wherein said documentation annotations comprises an intermediate representation of said syntactic structure; and
  automatically generating a second documentation file, wherein said second documentation file comprises a high level format, wherein said high level format comprises transparent human readable content and wherein said human readable content is localized in one or more of English and a non-English writable human language.

20. The computer usable medium as recited in claim 19 wherein said second documentation file comprises one or more of a web page, a manual page, and an abridged documentation information file wherein said abridged documentation information file is usable with a software tool.

21. The computer usable medium as recited in claim 20 wherein said high level format comprises HyperText Markup Language.

22. The system as recited in claim 20 wherein said high level format is Extensible Markup Language.

23. The computer usable medium as recited in claim 19 wherein said documentation is performed within the Command Line Interface of said operating system.

24. The computer usable medium as recited in claim 19 wherein said method further comprises:
  documenting commands, command variants, said syntactic structure, and said command files;
  categorizing said commands, said command variants, said syntactic structure, and said command files;
  clarifying variations in said commands, said command variants, said syntactic structure, and said command files between releases of said operating system; and
  displaying said commands, said command variants, said syntactic structure, and said command files.

25. The computer usable medium as recited in claim 19 wherein said method further comprises:
  generating command names;
  generating command syntax; and
  generating names for command arguments.

26. A system for generating documentation from command specifications of an operating system, said system comprising:
  means for parsing command files and command documentation content files for a syntactic structure wherein said operating system functions with a computer for performing an internetworking function for a network;
  means for creating a parse tree from said syntactic structure;
  means for annotating said parse tree with documentation annotations wherein an extended help utility associated with said network extracts logic for traversing said parse tree and re-implements said logic on said operating system;
  means for compiling said annotations into a first documentation file, wherein said documentation annotations comprises an intermediate representation of said syntactic structure; and
  means for automatically generating a second documentation file, wherein said second documentation file comprises a high level format wherein said high level format comprises transparent human readable content and wherein said human readable content is localized in one or more of English and a non-English writable human language.

27. The system as recited in claim 26 further comprising means for generating a second documentation file, wherein said second documentation file comprises one or more of a web page, a manual page, and an abridged documentation information file wherein said abridged documentation information file is usable with a software tool.

28. The system as recited in claim 27 wherein said high level format comprises HyperText Markup Language.

29. The system as recited in claim 27 wherein said high level format comprises Extensible Markup Language.

30. The system as recited in claim 26 wherein said documentation is performed within the Command Line Interface of said operating system.

31. The system as recited in claim 26 further comprising:
   means for documenting commands, command variants, said syntactic structure, and said command files;
   means for categorizing said commands, said command variants, said syntactic structure, and said command files;
   means for clarifying variations in said commands, said command variants, said syntactic structure, and said command files between releases of said operating system; and
   means for displaying said commands, said command variants, said syntactic structure, and said command files.

32. The system as recited in claim 26 further comprising:
   means for generating command names;
   means for generating command syntax; and
   means for generating names for command arguments.

33. The system as recited in claim 32 further comprising means for utilizing said command names in an interface application.

* * * * *